United States Patent [19]
Bordé

[11] Patent Number: 4,575,245
[45] Date of Patent: Mar. 11, 1986

[54] INTERFEROMETRIC OPTICAL DEVICES WITH PHASE CONJUGATING MIRRORS IN PARTICULAR FOR LASER GYROMETERS

[75] Inventor: Christian J. R. Bordé, Paris, France

[73] Assignee: Centre National de la Recherche Scientifique (C.N.R.S.), Paris, France

[21] Appl. No.: 366,662

[22] Filed: Apr. 8, 1982

[30] Foreign Application Priority Data

Apr. 8, 1981 [FR] France ................................ 81 07054

[51] Int. Cl.⁴ .............................................. G01B 9/02
[52] U.S. Cl. ...................................... 356/345; 356/350
[58] Field of Search ................ 350/393, 354; 356/345, 356/350; 372/93, 94, 99

[56] References Cited

U.S. PATENT DOCUMENTS 4,198,162  4/1980  Bjorklund et al. .................. 356/349
4,280,764  7/1981  Sica, Jr. et al. .................. 356/345 X
4,429,393  1/1984  Givliano ........................ 356/350 X

FOREIGN PATENT DOCUMENTS 0026128  4/1981  European Pat. Off. .
2446482  8/1980  France .
2449897  9/1980  France .

OTHER PUBLICATIONS

"Fiber-Optic Rotation Sensing with Low Drift" Ulrich, Optics Letters, vol. 5, #5, May 1980, pp. 173-175.
Journal of the Optical Society of America, vol. 70, No. 11, Nov. 1980 "Interferometry Using Conjugate-Wave Generation" by F. A. Hopf, pp. 1320-1323.
Optics Communications, vol. 31, No. 3, Dec. 1979 "Dynamic Interferometry and Differential Holography of Irregular Phase Objects Using Phase Conjugate Reflection" by A. E. Siegman, pp. 257-258.

Primary Examiner—Vincent P. McGraw
Attorney, Agent, or Firm—Schwartz, Jeffery, Schwaab, Mack, Blumenthal & Evans

[57] ABSTRACT

A laser radiation arrives at a separating plate, after which a first part of the radiation is applied to a fibre optic wound with N turns to end at a phase conjugating mirror which returns the radiation into the same fibre optic. The other part of the radiation, reflected by the plate, travels in a fibre optic defining another optical path, very close to the first, and wound in the opposite direction for N turns, terminating at the same phase conjugating mirror or at another mirror of the same type, which returns the incident wave through the same fibre optic. The state of interference, detected at the separating plate by a detector, represents any rotation of the gyrometer. The phase conjugating mirror or mirrors is or are advantageously defined by optically nonlinear media energized by two plane pump waves and travelling in opposite directions but on a colinear basis.

15 Claims, 13 Drawing Figures

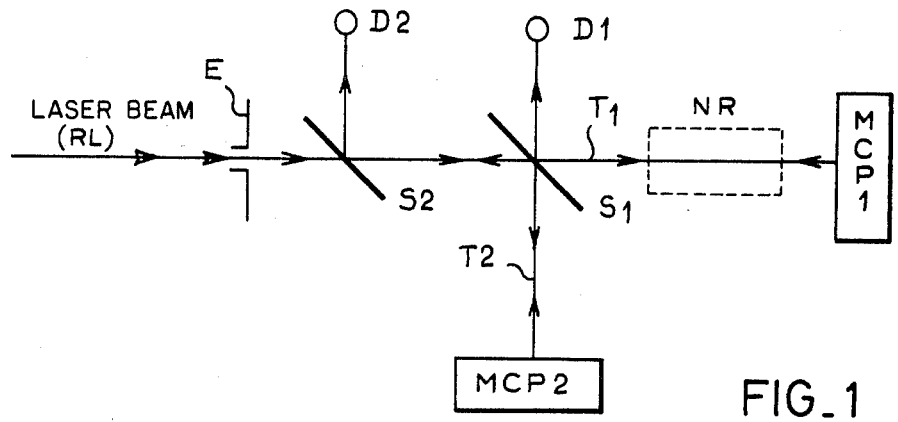
FIG._1
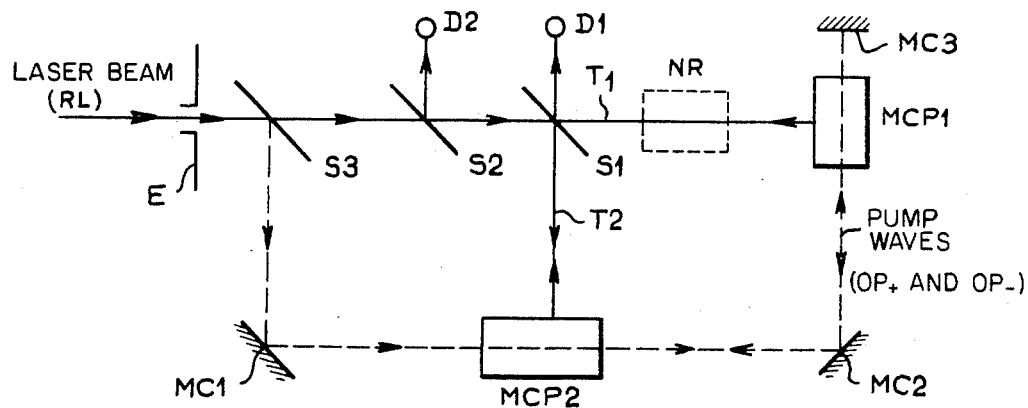
FIG._2
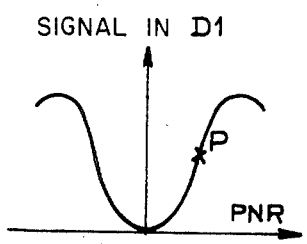
FIG._2A
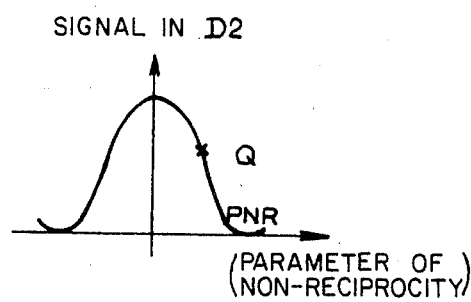
FIG._2B

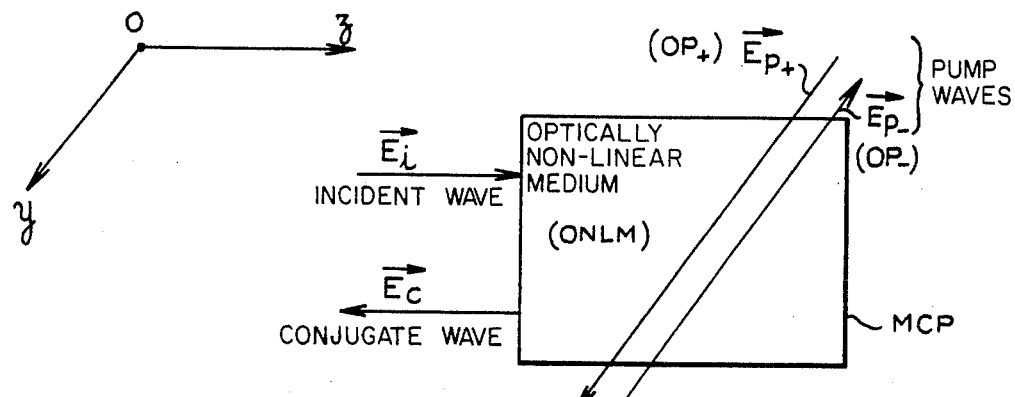
FIG_3
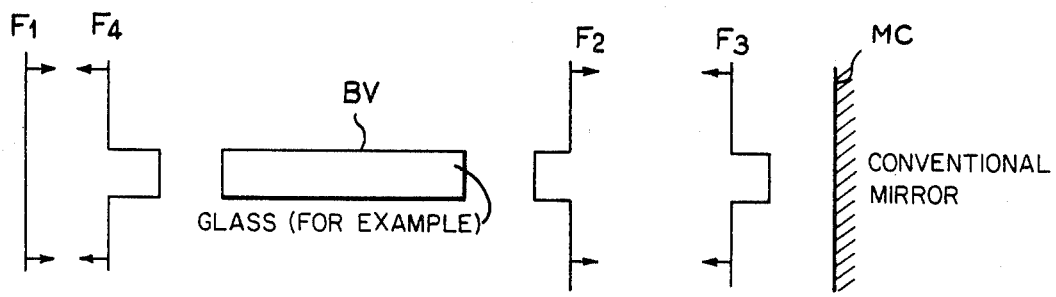
FIG_4A
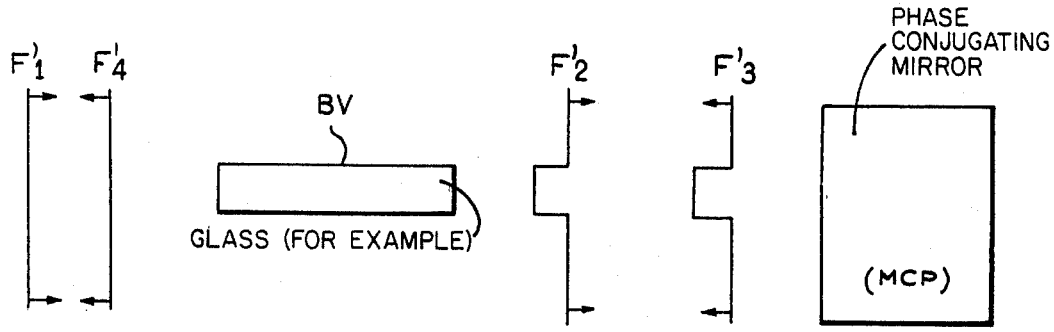
FIG_4B

INTERFEROMETRIC OPTICAL DEVICES WITH PHASE CONJUGATING MIRRORS IN PARTICULAR FOR LASER GYROMETERS

BACKGROUND OF THE INVENTION

The invention relates to interferometric optical devices energised with laser light, and is particularly concerned with passive laser gyrometers.

Any aberrations present in the optical path of the laser beam are disadvantageous in these devices, particularly in gyrometers, in which two waves are propagated in opposite directions around a substantially closed circuit. It is difficult to render and maintain these two waves strictly colinear, resulting in an offset and drift from zero. There is also an "optical noise", linked with optical path fluctuations. Although various expedients make it possible to produce gyrometers which can give satisfaction, it is highly desirable to improve the situation.

It is an object of the present invention to permit satisfactory compensation for aberrations in the optical paths of such devices.

SUMMARY OF THE INVENTION

According to the invention, there is provided an interferometric optical device comprising an input for receiving a laser radiation, a separating means for providing two different paths for the laser radiation downstream thereof, two mirror means interposed respectively in the one and the other of the downstream paths for returning the incident laser radiation along the same respective path but in the opposite direction, at least one of the two mirror means forming a phase conjugating mirror means, and means for comparing by interference the two laser radiations which are thus returned, whereby to detect optical non-reciprocities existing in one and/or the other of the said paths.

Further characteristic features and advantages of the invention will become evident from reading the ensuing detailed description in which reference is made to the accompanying drawings and which are given by way of example to illustrate various embodiments of the present invention.

BRIEF DESCRIPTION OF THE DRAWINGS

FIG. 1 is a basic diagram of an interferometer equipped with two phase conjugating mirrors;

FIG. 2 is a more detailed diagram of the interferometer in FIG. 1;

FIGS. 2A and 2B show response curves at detectors D1 and D2 of the interferometer of FIG. 1 or 2;

FIG. 3 is a diagram of a preferred embodiment of a phase conjugating mirror of the interferometer of FIGS. 1 and 2;

FIGS. 4A and 4B show respectively the mode of operation of a conventional mirror and of a phase conjugating mirror in reflecting a wave front;

DESCRIPTION OF THE PREFERRED EMBODIMENTS

Figure 5:
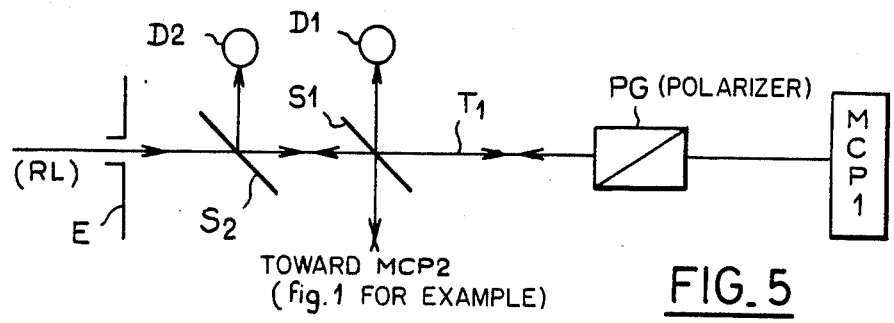
FIGS. 5 to 8 show various alternative embodiments of the interferometer of FIG. 1.

Referring first to FIG. 1, the interferometer includes an input E, for example a perforated screen, through which laser radiation RL can enter into the interferometer, which is of the Michelson or, more precisely, the Twyman-Green type.

A separating plate S1 in the interferometer divides the laser beam into two parts which follow respective different optical paths T1 and T2. In this case, the words "different optical paths" imply that the optical paths may be wholly different or that the optical paths may, in part, be the same with the divided laser beam travelling along the common part of the paths in opposite directions.

A part of the laser beam passes through the separating plate S1 and follows an optical path T1 to a first phase conjugating mirror MCP1. A part of this laser beam incident on the mirror MCP1 is reflected back in the opposite direction along the path T1 to return to the separating plate S1. By reflection from the plate S1, this returned beam will in part be diverted towards a detector D1. The other part of the beam will pass through the separating plate S1 to return along the radiation input path. Preferably, there is also provided another separating plate S2 which allows deflection of a part of the same reflected beam towards another photodetector D2. This part of the incident beam RL reflected by the separating plate S2 can be used, for example, as a reference for determining the intensity of the incident laser radiation.

The other part of the incident radiation at the separating plate S1 will be reflected downwardly by the separating plate S1, into a second optical path T2, terminating preferably at a second phase conjugating mirror MCP2. This mirror MCP2 reflects the part of the beam which it receives and this part is therefore returned via the separating plate S1. A part of this reflected radiation will pass through the separating plate S1 so that it, too, proceeds towards the photodetector D1. Another part will be reflected from the separating plate S1 to the separating plate S2 and then onto the photodetector D2.

As will be explained in more detail hereinafter, the signals obtained at the photodetector D1 and, possibly, at the photodetector D2, when this latter is provided, represent optical non-reciprocities existing on one and the other of the paths T1 and T2. In FIG. 1, the broken-line frame NR represents such a non-reciprocity. Although it may be preferable to use two phase conjugating mirrors or, as will be explained in greater detail hereinafter, a single conjugating mirror performing this role on both paths T1 and T2, it is also possible, when the non-reciprocity exists only on one of the paths, in this case T1, to use the phase conjugating mirror in conjunction with the optical path, and employ a conventional mirror instead of the mirror MCP2.

The phase conjugating mirrors may be of different types. Reflection with phase conjugating presupposes, a priori, a return of the wave front, and likewise, strictly speaking, a phase of the returned wave which is opposed to that of the incident wave, except for a constant phase, specific to the mirror, and independent of the incident wave (but this criterion of phase is not always regarded as imperative). In order to provide a phase conjugating mirror it is possible, for example, to use a mosaic of heterodyne detectors to explore the wave front of the laser radiation. By means of a laser forming a local oscillator, the phase is measured at the level of each detector and then, by control mechanisms, action is taken on phase shifters which will produce the returned conjugated wave. It has also been proposed to use a mosaic of retroreflectors consisting of a very large number of small cubic angle prisms for certain applications.

The embodiment of the invention shown in the accompanying drawings advantageously employs a non-linear effect in an optical medium. Already known, in this respect, are, for example, the stimulated Raman effect, the stimulated Brillouin effect, the three-wave mixtures (parametric amplifiers) or four-wave mixtures.

The embodiments of the invention uses a strict phase conjugating mirror based on a degenerated four-wave mixture, in the manner diagrammatically illustrated in FIG. 3. The mixture is referred to as degenerated when the four waves are of the same frequency.

For radiations of a visible wavelength, the optically non-linear media or ONLM presently preferred are bismuth and silicon oxide crystals ($Bi_{12}SiO_{20}$) or crystals of barium titanate ($TiO_3Ba$).

Considering an incident wave, defined in FIG. 3 by its electrical field $E_i$, in complex representation, with $$E_1 = U \cdot \exp\left[i(\omega t - kz + \phi_i)\right] \quad (1)$$

The wave is defined by the real part of this complex expression. Here, U is a possibly complex magnitude of the form Eo. f(x, y, z), representing the amplitude of the incident wave (Eo) and its geometry f(x, y, z). 'exp' denotes the complex exponential function, 'i' designates the habitual symbol of complex numbers, '$\omega$' denotes the angular period of the incident wave, 't' denotes time, 'k' is the wave number, 'z' denotes a measure of the spatial co-ordinate of the propagation of the wave along the axis Oz in FIG. 3 and '$\phi_i$' represents the phase of the wave at the moment t=0 and at the point for which z=0.

In a direction OY, there are applied to the optically non-linear medium ONLM, two pump waves generally designated $OP_+$ and $OP_-$, their respective electrical fields being designated $E_{p+}$ and $E_{p-}$ and respectively being of the following form:

$$E_{p+} = V \cdot \exp\left[i(\omega t + ky + \phi_+)\right] \quad (2)$$

$$E_{p-} = W \cdot \exp\left[i(\omega t - ky + \phi_-)\right] \quad (3)$$

In these equations, V and W are parameters of amplitude, preferably non-complex and independent, as far as possible, of space. 'k' denotes, in each case, the wave number of these pump waves according to the parallel direction OY, and $\phi_+$ and $\phi_-$ are representative of the initial phases of the two waves.

Although matters are, in practice, fairly complex, it is possible to make them understood diagrammatically by means of the following explanation which involves only a so-called "perturbative" development in physics, that is to say a development using increasing powers of field, where only the lowest order is retained.

Since the optically non-linear medium ONLM is susceptible to dielectric polarisation, which will be referred to hereinafter as P, there corresponds to this dielectric polarisation an interaction component P of the form:

$$P \text{ proportional to } (E_{p+}) \cdot (E_{p-}) \cdot (E_i^*) \quad (4)$$

In this equation, the symbol $E_i^*$ represents the conjugated complex of the incident electromagnetic field $E_i$, and is of the form:

$$E_i^* = U^* \cdot \exp\left[-i(\omega t - kz + \phi_i)\right] \quad (5)$$

Since the two pump waves are plane and co-linear waves, a man skilled in the art will understand that the expression of the magnitude P may be finally written in the following manner:

$$P \text{ proportional to } U^* \exp i(\omega t + kz - \phi_i) \cdot \exp i(\phi_+ + \phi_-) \quad (6)$$

This polarisation radiates a reflected electromagnetic field ($E_c$) which is also proportional to the equation (6) and which manifests the phase conjugating effect. Except for a constant complex coefficient, this reflected conjugated field is at all points obtained by reversing the time in the expression of the incident wave. This signifies that, spatially, the wave front will return exactly with the same geometry as it has prior to meeting the phase conjugating mirror. This is illustrated very diagrammatically in FIGS. 4A and 4B for the return of the wave front.

FIG. 4A assumes a plane incident wave front $F_1$ which traverses a glass rod. On account of the different speed of propagation through glass, on leaving the glass rod, the flat wave $F_1$ will be converted to a wave $F_2$ which remains flat, except in that part which forms a rearwardly detached portion where the wave has passed through the glass rod. After reflection by a conventional mirror MC, the wave returns in the form shown at $F_3$, the detached portion being now on the other side of the wave, according to the conventional optical reflection laws. After it has again passed along the glass rod BV, the wave $F_4$ will have a detached portion which is now of twice the amplitude.

This is different in the case of a phase conjugating mirror, as FIG. 4B shows. The plane incident wave $F'_1$ still incorporates a detached portion, illustrated at $F'_2$, after traversing the glass rod. But, after reflection on the phase conjugating mirror MCP, the wave $F'_3$ returns with a detached portion which is on the same side as the previous detached portion. The detached portion in question is therefore strictly cancelled out after a return passage through the glass rod BV, and the wave $F'_4$ then again becomes a strictly flat wave.

This simple example shows that a reflection on a phase conjugating mirror makes it possible to overcome any anomaly or optical abberation present on the path of propagation of a wave, the example of a glass rod being only a diagrammatic illustration.

Returning to equation (6), it will be seen that this involves an independent term for time and space, which comprises only the phases $\phi_+$ and $\phi_-$ of the two pump waves. Where two phase conjugating mirrors are used, it is desirable for the phases of the two pump waves to be such that this term is not significant. The simplest way of achieving this resides in employing the same pump waves for the two phase conjugating mirrors, as FIG. 2 shows.

Referring more particularly to FIG. 2, the pump waves are produced from a fraction of the incident laser radiation RL reflected initially by a third separating plate S3. The path of the pump waves from S3 is shown in FIG. 2 in broken line and comprises, firstly, a reflection from a conventional mirror MC1, a forward passage through the first phase conjugating mirror MCP2, a reflection on a second conventional mirror MC2, the forward passage through the phase conjugating mirror MCP1, a mere reflection back along the same path by a mirror MC3 which is either a conventional mirror or, preferably, a cubic angle retroreflector or cat's eye. After reflection, there is a return path to MCP1, then a return path to MCP2, after reflection on MC2, the wave returning finally via MC1 to be sent back towards S3, which it partially passes through, this radiation being lost or absorbed in the same way as the radiation which returns in the direction of the incidence of the laser radiation. The cavity generating the input laser radiation may include the path of the pump wave, MC3 being one of the mirrors of the cavity, and the structure being a little different on the input side E and the plate S3.

It will now be appreciated that the waves returned by phase conjugation along paths T1 and T2 respectively by mirrors MCP1 and MCP2 will be unaltered by an optical aberrations which may exist along these paths.

In each of the arms or paths such as T1 or T2 of the interferometer, the return wave at a separator, such as S1 or S2, is independent of the optical path in this arm, and of the distance travelled by the waves, except when the paths T1 and/or T2 are subject to non-reciprocities.

Among the non-reciprocities (the broken-line frame NR in FIG. 1) which may be detected and measured with the device of FIG. 1 or FIG. 2, are:

the Faraday effect, which is non-reciprocity in magnetic media saturated dispersion which is non-linear behaviour of a medium in amplitude, so that the intensity of the wave reflected by the phase conjugating mirror is generally different from the intensity of the light incident thereon; for example, gaseous iodine is a medium which can be saturated at a wavelength of 5 145 Angstrom units (C.R.Acad.Sc. Paris 277B, 381, (1973)). The saturated dispersion can be applied to Doppler spectroscopy and the frequency control of lasers.

FIGS. 2A and 2B show the form of signals detected by the photodetectors D1 and D2 in FIGS. 1 and 2. This amplitude is shown in the ordinate, the abscissa representing a parameter relating to the non-reciprocity of the medium present in one and/or the other of the two arms T1 and T2. More precisely, this parameter represents the different of optical path between the two arms, created by the non-reciprocity.

In the absence of any non-reciprocity, the two waves which return towards the laser will have undergone exactly the same degree of phase change since the phase changes on the two paths, and at the reflection or transmission of the separator S1, are cancelled out by the phase conjugation; therefore there is a constructive interference and the signal picked up at D2 is maximum when the non-reciprocity parameter PNR is nil (FIG. 2B).

In contrast, for the signal detected at D1, a destructive interference is expected and in principle a nil signal for a nil non-reciprocity (FIG. 2A).

This situation is verified by a reversal operation of the time applied to the device: this reversal of time must return to the laser a wave similar to the incident wave and conjugated therewith.

For practical reasons, just the signal obtained at the level of the detector D1 is generally not sufficient, and therefore there will preferably be provided a second detector at D2 with the associated separating plate S2, in order to employ either just the signal obtained at D2 or a combination of the two signals obtained at D1 and D2 which may for example be the difference D1−D2.

Next, with reference to FIGS. 5 to 8, various embodiments will be described which may be used in combination and which make it possible, in particular, to improve the use of the signals detected.

FIG. 5 shows a polariser such as a Glan prism interposed in the path T1 constituting one of the arms of the interferometer. This polariser makes it possible to achieve a selectivity of the conjugated wave, eliminating any parasitic signals emanating, for example, from the phase conjugating mirror. Of course, a polariser of the same type can be placed in the other arm T2, of which only the start is shown in FIG. 5, and in FIGS. 6 to 8.

Figure 6:
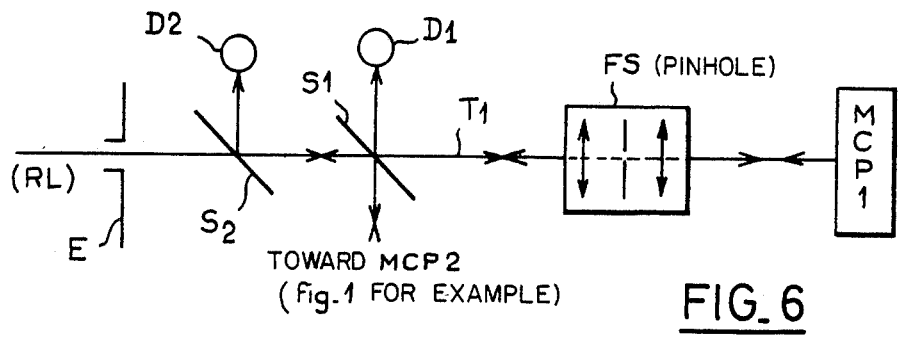

In FIG. 6 there is interposed in the arm T1 of the interferometer, a spatial filter consisting of a diaphragm of the pinhole type placed at the focal point of a telescope, shown diagrammatically in FIG. 6 by two lenses disposed one on either side of the pinhole. This makes it possible to select the mode of electromagnetic propagation conventionally designated by $TEM_{00}$ and so makes it possible to achieve a better rejection of unwanted signals. In addition, such a filter may advantageously be interposed on the other arm T2 of the interferometer.

Figure 7:
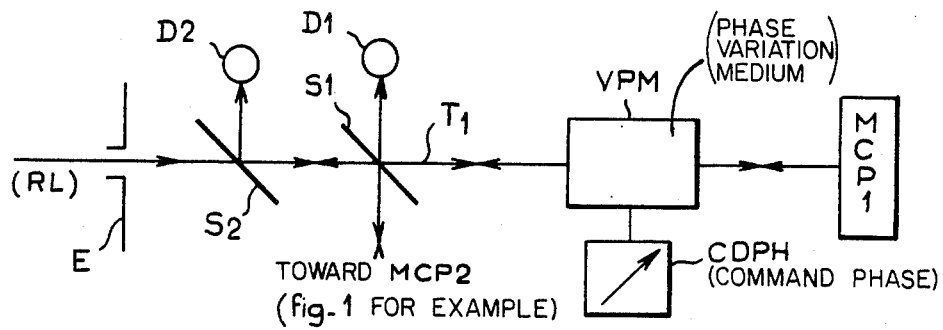

FIG. 7 illustrates another embodiment which employs a phase-shifting of the radiation on at least one of the two arms of the interferometer, in this case the arm T1. The active part of the phase shifter, referred to as VPM, consists of a medium capable of acting on the phase of the wave and may comprise itself a non-reciprocal but known system, being controlled by a phase control means CDPH. In order to provide such a phase shifter, it is possible for example to use the aforementioned Faraday effect in a manner known per se. The disposition shown in FIG. 7 has the considerable advantage of permitting adjustment of the point of operation of the interferometer since it makes it possible to vary the phase on one of the paths or to cause it to vary differently on the two paths T1 and T2. It is then possible, for example, to shift the operating point of the interferometer to bring it to the point P in FIG. 2A, or indeed to the point Q in FIG. 2B. In this way, establishing, for example, the difference between the signals picked up at D1 and D2, will finally produce a signal which passes from negative values to positive values, nil value corresponding to the absence of non-reciprocity in the part to be analysed, designated NR in FIGS. 1 and 2.

Figure 8:
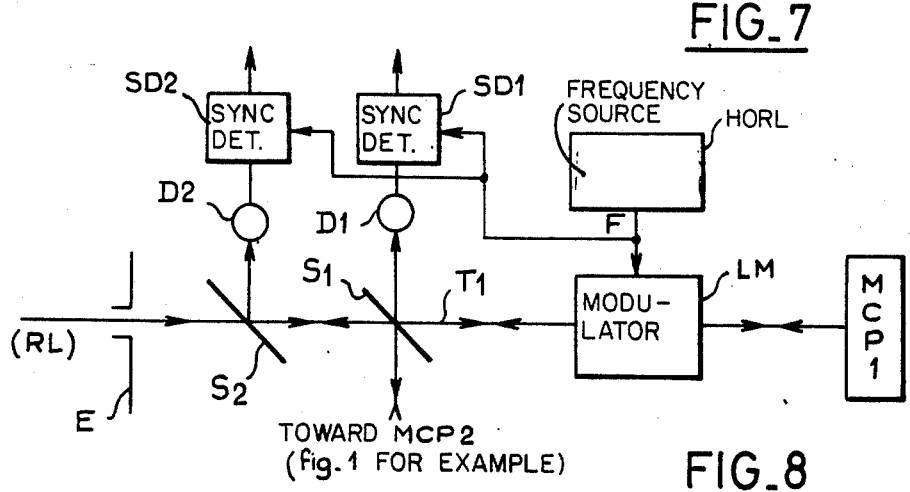

Another alternative is illustrated in FIG. 8 and it involves a modulation on the path T1. A phase modulator LM is interposed on the path T1 of the interferometer, this modulator being supplied from a frequency source F, a source which is designated HORL in FIG. 8. The electrical signals picked up by the photodetectors D1 and D2 are applied respectively to synchronous detecting stages shown diagrammatically at SD1 and SD2, which also receive the modulation frequency F. Such a modulation greatly facilitates the use of the detected signals. This modulation may or need not be reciprocal, dependent particularly upon the response time of the phase conjugating mirrors employed.

In a preferred embodiment, in the manner illustrated in FIG. 8, phase modulation in one diredtion is provided on the arm T1 of the interferometer and opposing phase modulation at the same frequency on the other arm T2 of the interferometer which is shown in part in FIG. 8.

Finally, referring back to equation (6) above, it is apparent that the wave returned by the phase conjugating mirrors comprises a term which depends on the phases $\phi_+$ and $\phi_-$ of the pump waves; to carry out the abovementioned modulation or phase regulation, it is possible to act directly on the phases of the pump waves instead of interposing a phase modulator or a phase variator on the paths T1 and T2, as FIGS. 8 and 7 show.

A preferred embodiment of the present invention relates to passive laser gyrometers, of which two embodiments will now be described, reference being made to FIGS. 9 and 10.

Figure 9:
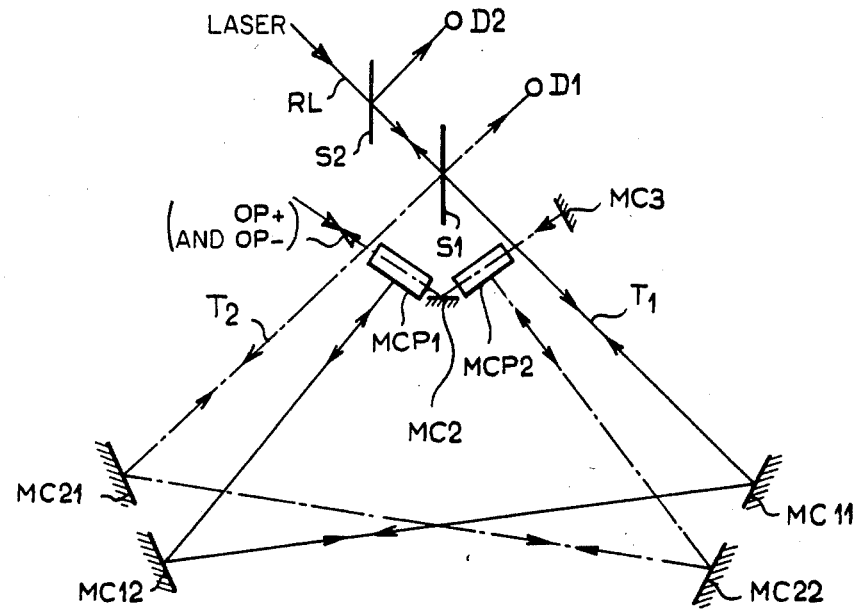
FIG. 9 shows a first embodiment of a passive laser gyrometer including phase conjugating mirrors.

In FIG. 9, the incident laser radiation RL is applied first of all to the plate S2, then to the separating plate S1. The part of the radiation which traverses S1 follows a path T1 which includes reflection by conventional mirrors MC11, MC12, to complete a substantially closed circuit which terminates at a first phase conjugating mirror MCP1 placed close to the separating plate S1.

The part of the incident radiation which is reflected by the separating plate S1 follows the path illustrated by the broken line T2 which passes first to a mirror MC21, close to MC12, and then to a mirror MC22, close to MC11, to end, finally, at a second phase conjugating mirror MCP2, close to the separating plate S2 and close to MCP1. The two phase conjugating mirrors respectively send back the waves which they receive so that they can return along the same path as previously, back respectively along paths T1 and T2 to the separating plate S2.

There are then interferences at the separating plate S1 and the optical signal which results therefrom is picked up by the photodetector D1. Other, different, interferences occur as previously indicated at the separating plate S2 and the optical signal which results therefrom is picked up by the other photodetector D2.

It is therefore apparent that the two paths followed by the two laser radiations downstream of the separating plate S1 form two substantially closed circuits which are substantially of the same geometry and which are virtually superimposed one on the other.

A man skilled in the art will understand that this makes it possible to provide a passive gyrometer comparable in its physical principle to the device referred to as Sagnac's device. Indeed, when the whole of the system is turning, the result is an optical non-reciprocity of inverse direction on the two paths, which makes it possible to obtain a signal representing the said rotation.

This structure, with phase conjugating mirrors, is very advantageous in the case of a passive gyrometer because it makes it possible in particular to obviate all the aberrations encountered by electromagnetic radiations on the separate paths T1 and T2; in other words, the optical device is automatically compensated whatever aberrations may be present on the optical paths, and also the differences between reciprocal and stationary steps.

Of course, and as previously, in order to facilitate the use of detecting signals, it will be advantageous to use the alternative embodiments with reference to FIGS. 5 to 8.

In particular, by employing a reciprocal phase modulation in one of the arms or on both arms, by means of a phase modulator disposed immediately after the separator S1, a high performance device is obtained (the final duration of the to-and-fro path on each arm shifts the phase of the action of the modulator on the two-and-fro beams). Accordingly, at least one of the arms or downstream paths forms at least one loop, associated with a phase-conjugating mirror.

More generally, with such a passive gyrometer including two phase conjugating mirrors, the state of interference detected on D1 or D2 is independent of the position of the mirrors, and of any differences in reciprocal steps likely to occur on the arms. Thus, a particularly interesting system is obtained since, by its construction, the combination of means employed is sensitive only to the phenomenon which is to be measured, in other words the rotation of the gyrometer.

Figure 10:
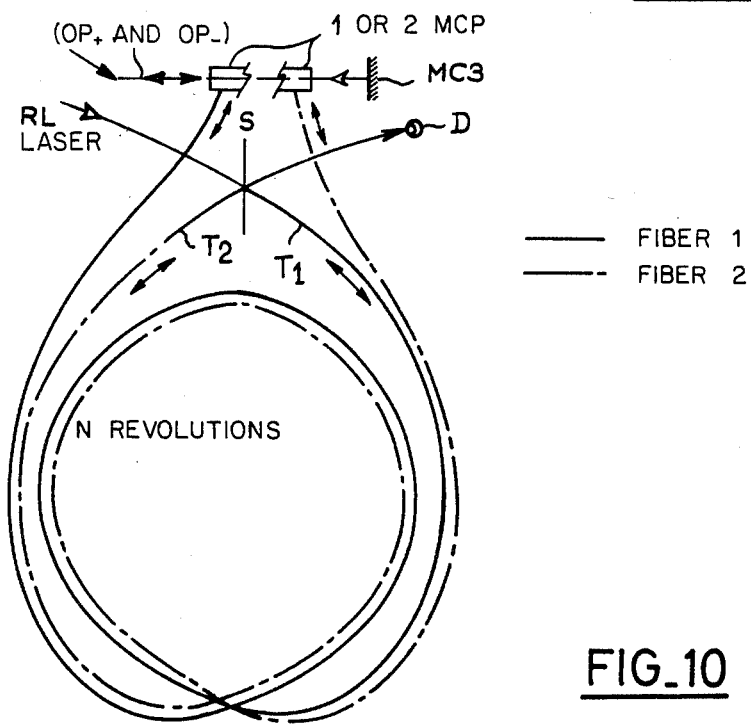
FIG. 10 shows a further embodiment of the gyrometer of FIG. 9 in which optical paths are defined by fibre optics.

FIG. 10 illustrates an even more interesting form of embodiment of gyrometer which is open to the same variations as described hereinabove. To clarify the drawing, only a single separating plate S is shown which corresponds to the above-described plate S1, and which receives the incident laser radiation. A first fibre optic T1, shown by thick continuous lines, receives the radiation which passes through the separating plate S. This fibre has N turns, ending finally at a phase conjugating mirror MCP. On the other side of the separating plate S, a second fibre optic, illustrated by a chain-dotted line, defines a path T2 very close to the path T1, including the same number of turns N but in an opposite direction, so that it, too, ends at the phase conjugating mirror MCP. It will be seen that the two optical paths T1 and T2 are again substantially closed, the mirror MCP being very close to the separating plate S; these optical paths are of substantially the same geometry and are spatially close to each other.

The embodiment shown in FIG. 10 shows another characteristic feature which is that a single phase conjugating mirror MCP may, in certain configurations, play the part of the two mirrors MCP1 and MCP2 previously employed.

Of course, in FIG. 10, as in FIG. 9, the phase conjugating mirror or mirrors is or are suitably energised by pump waves $OP_+$ and $OP_-$ which may themselves also emanate from the incident laser radiation (an alternative embodiment which is not illustrated), while the return of the pump wave to obtain the two directions of propagation is assured by a conventional mirror MC3, preferably of the cat's eye or cubic angle type.

The interference pattern present at the plate S in FIG. 10 is detected by a photodetector D and may be treated as previously, or in any other known manner in order to obtain a signal representing rotation of the gyrometer. In the same way as in the other embodiments, it is possible of course to provide another separating plate disposed upstream of S and associated with a second detector.

The embodiment in FIG. 10 has another quite considerable advantage: in conjunction with the phase conjugating mirrors of such a gyrometer it is possible to employ multimode fibre optics, which has not been possible in practice with the passive gyrometers of the prior art.

Furthermore, it is possible to provide phase conjugating mirrors of which the conjugated wave is amplified in relation to the incident wave. This makes it possible to employ very long fibre optics and consequently to increase the sensitivity of the gyrometer by at least one order of magnitude.

It will be appreciated that the present invention is not confined to the embodiments described above with reference to the drawings but extends to any variation within the spirit and scope of the invention.

I claim:

1. An interferometric optical device comprising:
   an input for receiving laser radiation;
   means positioned to receive said laser radiation for separating said laser radiation into first and second split beams propagating respectively along first and second beam paths;
   first mirror means positioned in said first beam path for returning a first reflected beam which is a phase conjugate of said first split beam back along said first beam path;
   second mirror means positioned in said second beam path for returning a second reflected beam which is a phase conjugate of said second split beam back along said second beam path; and
   means positioned to receive said first and second reflected beams for comparing said first and second reflected beams through their mutual interference, and thus for detecting an optical non-reciprocity in said first beam path.

2. An interferometric optical device according to claim 1, wherein the first mirror means comprises an optically non-linear medium.

3. An interferometric optical device according to claim 2, wherein there are provided means for applying two pump waves of respective opposite directions to the non-linear medium.

4. An interferometric optical device according to claim 3, wherein said pump wave applying means is adapted to apply two pump waves of the same frequency.

5. An interferometric optical device according to claim 4, wherein the pump wave applying means are adapted to produce the pump waves from a part of the input laser radiation.

6. An interferometric optical device according to claim 1, wherein the separating means is positioned to receive said first and second reflected beams, and wherein the comparing means includes the separating means, another separating means positioned to receive said first and second reflected beams, and first and second photodetector devices which respectively receive radiation extracted by said first and second separating means.

7. An interferometric optical device according to claim 1, wherein a spatial filter is arranged in at least one of the first and second beam paths.

8. An interferometric optical device according to claim 1, wherein means for polarising the laser radiation are provided for polarising the radiation propagating along at least one of the first and second beam paths.

9. An interferometric device according to claim 1, further comprising means for optically dephasing first and second beam paths.

10. An interferometric optical device according to claim 1, further comprising means for phase modulation of the laser radiation passing along at least one of the first and second beam paths, the modulation being carried out at a predetermined frequency, and means for synchronous demodulation at the same frequency as the signals provided by the comparison means.

11. An interferometric optical device according the claim 1, wherein the two phase conjugating mirror means are close to each other or are combined into a single phase conjugating mirror means.

12. An interferometric optical device according to claim 1, wherein at least one of the first and second beam paths forms at least one loop.

13. An interferometric optical device according to claim 1, wherein at least one of the first and second beam paths is at least partially defined by fibre optics.

14. An interferometric optical device according to claim 13 wherein the fiber optics are multimode fibers.

15. An interferometric optical device according to claim 1, wherein the first and second beam paths form two substantially closed circuits which are substantially of the same geometry and which are spatially close to each other.

* * * * *